US006724583B2

United States Patent
Seigler et al.

(10) Patent No.: US 6,724,583 B2
(45) Date of Patent: Apr. 20, 2004

(54) ADJUSTABLE PERMANENT MAGNET BIAS

(75) Inventors: Michael Allen Seigler, Pittsburgh, PA (US); Gregory John Parker, Warrendale, PA (US); Petrus Antonius Van der Heijden, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 286 days.

(21) Appl. No.: 09/969,477

(22) Filed: Oct. 2, 2001

(65) Prior Publication Data

US 2002/0075611 A1 Jun. 20, 2002

Related U.S. Application Data

(60) Provisional application No. 60/256,738, filed on Dec. 19, 2000.

(51) Int. Cl.[7] .................................................. G11B 5/39
(52) U.S. Cl. .................................................. 360/324.12
(58) Field of Search .................................... 360/324.12

(56) References Cited

U.S. PATENT DOCUMENTS

| 5,247,413 A | 9/1993 | Shibata et al. |
| 5,323,285 A | 6/1994 | Smith |
| 5,576,914 A | 11/1996 | Rottmayer et al. |
| 5,668,688 A | 9/1997 | Dykes et al. |
| 5,731,937 A | 3/1998 | Yuan |
| 5,818,685 A | 10/1998 | Thayamballi et al. |
| 6,134,089 A | 10/2000 | Barr et al. |
| 6,219,205 B1 | 4/2001 | Yuan et al. |
| 6,233,125 B1 | 5/2001 | Knapp et al. |
| 6,249,407 B1 | 6/2001 | Aoshima et al. |
| 6,538,858 B1 * | 3/2003 | Hasegawa et al. ...... 360/324.12 |

OTHER PUBLICATIONS

D. J. Seagle et al., "Underlayer Noise In Rigid–Disk Perpendicular Recording", *Journal of The Magnetics Society of Japan.*, vol.13, Supplement No. S1, pp. 633–638 (1989).
K. Sato et al., "Noise Characteristics of CoCrTa/NiFe Perpendicular Recording Media", *IEEE Trans. On Magn.*, vol. 29, No. 6, pp. 3730–3732 (1993).
N. R. Darragh et al., "Observation of Underlayer Domain Noise in Perpendicular Recording Disks", *IEEE Trans. On Magn.*, vol. 29, No. 6, pp. 3742–3744 (1993).
T. Ando et al., "Triple–Layer Perpendicular Recording Media for High SN Ratio and Signal Stability", *IEEE Trans. On Magn.*, vol. 33, No. 5, pp. 2983–2985 (1997).

* cited by examiner

*Primary Examiner*—A. J. Heinz
(74) *Attorney, Agent, or Firm*—Benjamin T. Queen, II, Esq.; Pietragallo, Bosick & Gordon

(57) ABSTRACT

A read head, particularly suitable for a magnetic disc storage system, includes a read sensor having an air-bearing surface and an opposing top surface. The read head also includes a permanent magnet positioned adjacent the top surface of the read sensor for generating a magnetic bias field in the read sensor. The permanent magnet has a magnetization in a direction other than normal to the air-bearing surface of the read sensor.

19 Claims, 6 Drawing Sheets

ADJUSTABLE PERMANENT MAGNET BIAS

CROSS REFERENCE TO RELATED APPLICATION

This application claims the benefit of U.S. Provisional Application No. 60/256,738 filed Dec. 19, 2000.

FIELD OF THE INVENTION

The invention relates to magnetic recording heads, and more particularly, to a permanent magnet for generating a magnetic bias field in a read head of such recording heads.

BACKGROUND OF THE INVENTION

Devices utilizing the giant magnetoresistance (GMR) effect have utility as magnetic sensors, especially as read sensors in read heads used in magnetic disc storage systems. The GMR effect is observed in thin, electrically conductive multi-layer systems having magnetic layers. In operation, a sense current is passed through the read head of the magnetic disc storage system. The presence of a magnetic field in the storage media adjacent to the sensor changes the resistance of the sensor. A resulting change in voltage drop across the sensor due to the change of the resistance of the sensor results in an output voltage that can be measured and used to recover magnetically stored information.

The output voltage is affected by various characteristics of the sensor. The sense current can flow through the sensor in a direction that is perpendicular to the planes of the layers or stack strips that comprise the sensor, i.e. current-perpendicular-to-plane component or CPP, or the sense current can flow through the sensor in a direction that is parallel to the planes of the layers or stack strips, i.e. current-in-plane or CIP. The CPP operating mode can result in higher output voltage than the CIP operating mode. The higher the output voltage, the greater the precision and sensitivity of the read head sensor in sensing magnetic fields from the magnetic medium. Therefore, it is desirable to maximize the output voltage of the read head and specifically the sensor thereof.

A read head for use in a disc drive can include a first lead/shield, a second lead/shield, and a GMR sensor, or also referred to as a read sensor or a GMR stack, located between the first lead/shield and the second lead/shield. For operation of the sensor, a sense current is caused to flow through the read head and particularly through the sensor. As resistance of the sensor changes, the voltage across the sensor changes. This is used to produce the output voltage.

The CPP-GMR has been shown to potentially have a larger GMR than CIP sensors because all of the current needs to pass through every ferromagnetic/non-magnetic/ferromagnetic (FM/NM/FM) series of interfaces and none of the current is shunted around the interfaces. Since every film and interface leads to additional resistance, it is desired to have all the films and interfaces contribute to the overall change in resistance. One such sensor is a GMR multilayer, which consists of a series of FM/NM bilayers. Every series of interfaces is an opportunity for interfacial spin dependent scattering and every FM material is an opportunity for bulk spin dependent bulk.

For a CPP type sensor, the sensor may be magnetically biased to reduce noise in the read signal and improve the linearity and gain of flux sensing. The magnetic biasing may be achieved by placing a permanent magnet adjacent the sensor such that the magnetization of adjacent ferromagnetic layers of the sensor is 90° with respect to each other. More specifically, this may be achieved by placing a permanent magnet having a magnetization in a direction that is normal to an air-bearing surface of a read sensor such that the magnetization of the adjacent ferromagnetic layers that make up the read sensor are biased by the permanent magnet, and specifically by the magnetic bias field, to a different position.

When using a permanent magnet to bias a read sensor, it is important that the sensor is biased properly. If the sensor is, for example, either over or under biased, the signal will become non-linear and create a loss of amplitude, signal asymmetry and detection and tracking problems. One difficult aspect of properly biasing a sensor is that the actual bias point cannot be exactly determined until after almost the entire read head is built. If the bias point is not correct and there is no way of adjusting the bias, the read head may not be usable.

There is identified a need for an adjustable permanent magnet bias for magnetically biasing a read sensor.

SUMMARY OF THE INVENTION

The invention meets the identified need, as well as other needs, as will be more fully understood following a review of this specification and drawings.

In accordance with an aspect of the invention, a current perpendicular to the plane read head comprises a read sensor having an air-bearing surface and an opposing top surface and a permanent magnet positioned adjacent the top surface of the read sensor. The permanent magnet generates a magnetic bias field in the read sensor such that the biasing of the read sensor causes the change in resistance to operate in a more linear fashion making the change in resistance of the sensor and the resulting change in voltage drop across the sensor easier to measure. The permanent magnet has a magnetization in a direction other than normal to the air-bearing surface of the read sensor. The specific direction of magnetization of the permanent magnet is selected according to the desired amount of magnetic bias field to be generated in the read sensor.

In accordance with another aspect of the invention, a current perpendicular to the plane read head comprises a read sensor and means for generating and adjusting a magnetic bias field in the read sensor.

In accordance with yet another aspect of the invention, a read head for a magnetic disc storage system comprises a read sensor having an air-bearing surface and a permanent magnet positioned adjacent the read sensor for magnetically biasing the read sensor. The permanent magnet has a magnetization set in a direction other normal to the air-bearing surface of the read sensor. The direction of magnetization in the permanent magnet has a direct relationship to the strength of the magnetic field that biases the read sensor.

In accordance with a further aspect of the invention, a magnetic disc drive storage system comprises a housing, a rotatable magnetic storage medium positioned in the housing, and a movable recording head mounted in the housing adjacent the magnetic storage medium. The recording head includes a current perpendicular to the plane read head. The current perpendicular to the plane read head comprises a read sensor having an air-bearing surface and an opposing top surface and a permanent magnet positioned adjacent the top surface of the read sensor for generating a magnetic bias field in the read sensor. The permanent magnet has a magnetization in a direction other than normal to the air-bearing surface of the read sensor.

In accordance with an additional aspect of the invention, a method of using a permanent magnet to generate a magnetic bias field in a read sensor having an air-bearing surface and an opposing top surface comprises establishing a magnetization in the permanent magnet, and positioning the permanent adjacent the top surface of the read sensor such that the magnetization of the permanent magnet is in a direction other than normal to the air-bearing surface of the read sensor. The method may also include adjusting the magnetization direction of the permanent magnet to adjust the strength of the magnetic bias field generated in the read sensor. The direction of magnetization of the permanent magnet may be pre-determined according to the desired amount of magnetic bias field to be generated in the read sensor. The permanent magnet bias can be adjusted after, for example, quasi-static testing or dynamic (spin-stand) testing to determine the optimum bias conditions for reading back data.

DETAILED DESCRIPTION OF THE INVENTION

The invention provides an adjustable permanent magnet bias for a magnetic recording head, particularly suitable for use with a magnetic disc storage system. A recording head is defined as a head capable of performing read and/or write operations.

Figure 1:
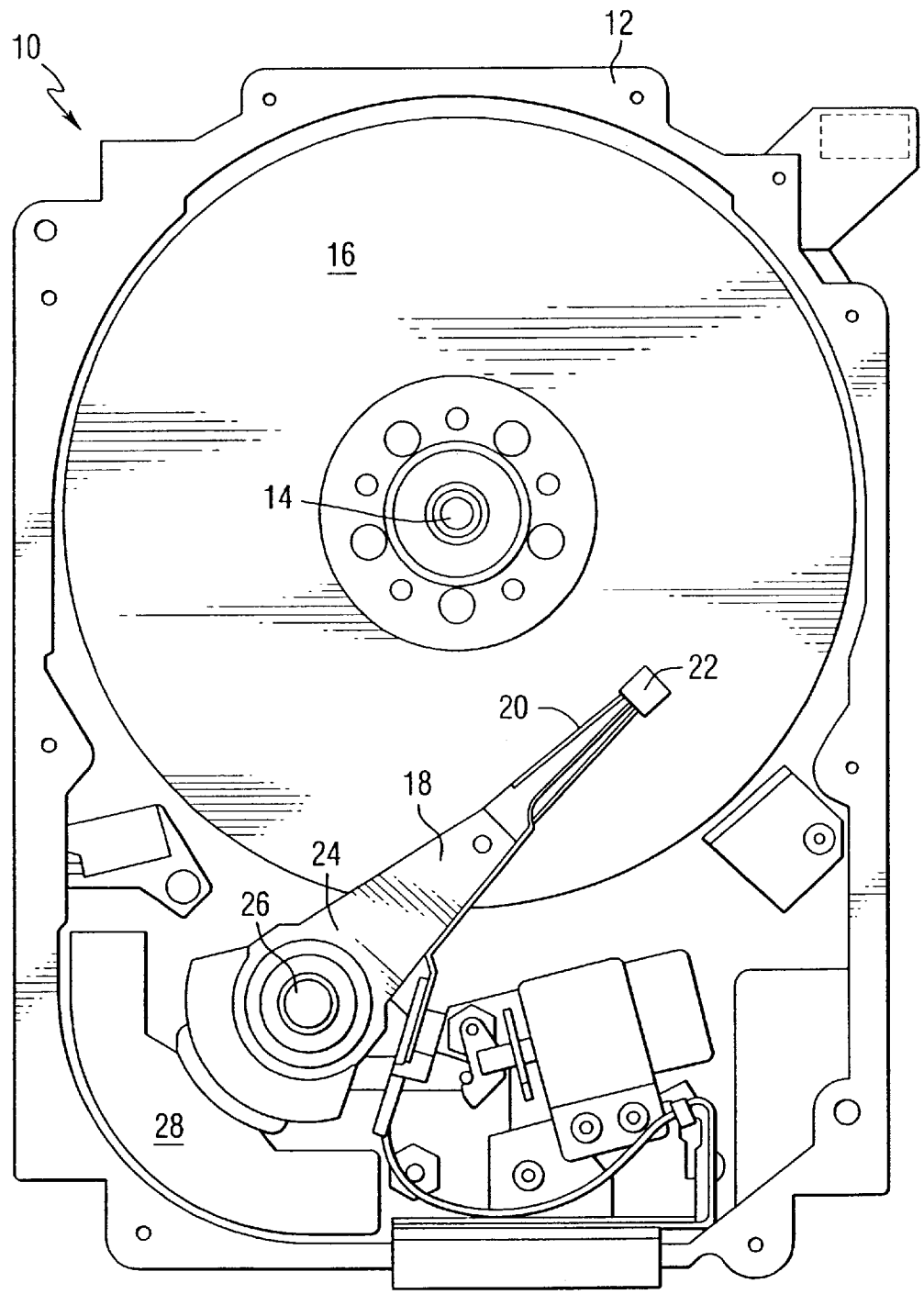
FIG. 1 is a pictorial representation of a disc drive that can use an adjustable permanent magnet bias constructed in accordance with this invention.

FIG. 1 is a pictorial representation of a disc drive 10 that can utilize the adjustable permanent magnet and read head constructed in accordance with this invention. The disc drive includes a housing 12 (with the upper portion removed and the lower portion visible in this view) sized and configured to contain the various components of the disc drive. The disc drive includes a spindle motor 14 for rotating at least one magnetic storage medium 16 within the housing, in this case a magnetic disc. At least one arm 18 is contained within the housing 12, with each arm 18 having a first end 20 with a recording and/or read head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

Figure 2:
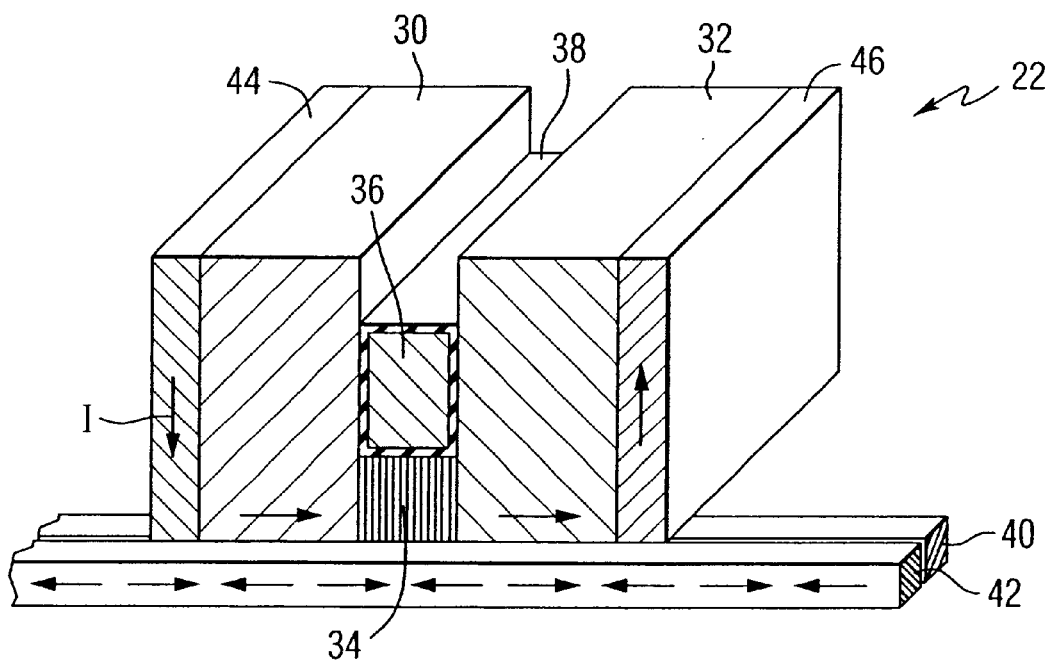
FIG. 2 is an isometric sectional view of a portion of a read head having an adjustable permanent magnet bias constructed in accordance with this invention.

FIG. 2 is a cross-sectional view of a portion of a read head 22 constructed in accordance with this invention. The read head 22 includes first and second conductive shields 30 and 32 positioned on opposite sides of a read sensor 34, which may be a giant magnetoresistance type sensor although other type sensors such as magnetoresistance (MR) or the like may be used with the invention. A permanent magnet 36, which may be encased in an insulating material 38 as shown, is positioned above the lead sensor 34. As known, the read sensor 34 may include alternating layers of ferromagnetic and non-magnetic materials structured, as shown, to form a current perpendicular to the plane (CPP) type sensor. The ferromagnetic material may be, for example, CoFe, NiFe, CoNiFe, Co and CoNi, while the permanent magnet 36 may be formed of, for example, CoX where X can be, for example, Pt, Ta, Cr, B or any combination of these elements.

The read head 22 is configured to fly adjacent to a magnet recording medium 16 having a plurality of tracks, illustrated by tracks 40, 42. The tracks 40, 42 contain magnetic domains capable of storing digital information according to the polarity of magnetization thereof. The magnetic domains are illustrated by arrows, shown in track 40 only in FIG. 2. Conductors 44, 46 are positioned adjacent to shields 30, 32 respectively and are used to supply a constant current I that flows through the shields 30 and 32 and the read sensor 34 in a current perpendicular to the plane (CPP) direction. When the read sensor 34 is subjected to an external magnetic field, the resistance of the GMR stack that forms the read sensor 34 changes, thereby changing the voltage across the stack. The stack voltage is then used to produce an output voltage. Alternatively, a voltage may be applied and the current measured.

Figure 3:
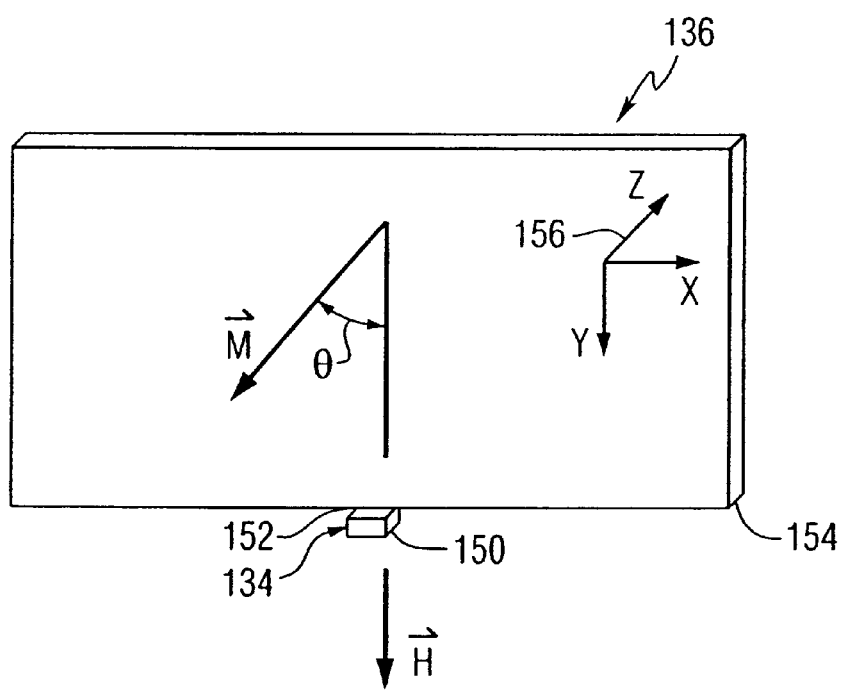
FIG. 3 is an isometric view of a permanent magnet and read sensor for illustration of the invention.

FIG. 3 is an isometric view of a read sensor 134 and permanent magnet 136 arrangement, similar to the arrangement of the read sensor 34 and permanent magnet 36 shown in FIG. 2. The read sensor 134 includes an air-bearing surface 150 and an opposing top surface 152. The air-bearing surface 150 is positioned to fly adjacent to the magnetic recording medium 16, and specifically the tracks 40, 42 thereof. The permanent magnet 136 includes a bottom surface 154 that is positioned adjacent the top surface 152 of the read sensor 134. The bottom surface 154 of the permanent magnet 136 may be in direct contact with the top surface 152 of the read sensor 134, or a gap may be provided therebetween. As illustrated in FIG. 3, the bottom surface 154 may be contained in a plane that is generally parallel to a plane containing the top surface 152 of the read sensor and an additional plane that contains the air-bearing surface 150 of the read sensor 134. However, in accordance with the invention, the bottom surface 154, the top surface 152, and the air-bearing surface 150 may be in planes that are other than parallel that will still allow the permanent magnet 136 to generate a magnetic bias field in the read sensor 134.

The permanent magnet 136 is positioned adjacent the read sensor 134 for generating a magnetic biasing field in the read sensor 134 to, for example, reduce noise in the read signal and improve the linearity and gain of flux sensing. Ideally, the goal is to bias the magnetization of the ferromagnetic layers to where the magnetization directions are generally 90° with respect to each other. There are many factors that affect the magnetic bias such as, for example, the size of the gap, if any, between the permanent magnet 136 and the read sensor 134, the thickness and size of the permanent magnet 136 relative to the size of the read sensor 134, or the magnetization strength of the permanent magnet 136. When generating a magnetic bias field with permanent magnet 136, it is important that the sensor 134 is biased properly. For example, if the read sensor 134 is either over or under biased, the signal may become non-linear and create a loss of amplitude, signal asymmetry and other detection and tracking problems. It has been determined that one difficult aspect of properly biasing a sensor is that the amount of biasing needed to position the magnetization of the adjacent layers of the sensor 134 in the ideal 90° with respect to each other position cannot be exactly determined until after assembling the sensor 134. Placement of a permanent magnet adjacent the sensor 134 where the permanent magnet has a magnetization in a direction that is normal to the air-bearing surface 150 of the sensor 134 may not result in proper biasing of the sensor 134.

Accordingly, it has been determined that the amount of biasing to be generated in the sensor 134 (represented schematically as the bias field by the vector H in FIG. 3) may be varied by adjusting the magnetization direction of the permanent magnet 136. Specifically, as shown in FIG. 3, the magnetization, represented by the vector M, is positioned at an angle of ⊖, where the angle ⊖ is defined as an angle extending from a line normal to the air-bearing surface 150 of the adjacent read sensor 134. The magnetization M may be set by applying a magnetic field to the permanent magnet 136 that is larger than the coercivity of the permanent magnet 136. A coordinate system 156 is illustrated in FIG. 3 for point of reference in the description of the invention.

In accordance with the invention, the permanent magnet 136 is larger than the read sensor 134. As shown in FIG. 3, the permanent magnet 136 may be approximately ten times larger than the read sensor 134, however, in an actual read head device, a permanent magnet that is more than ten times the size of the read sensor 134 may be employed. When the permanent magnet 136 is much larger than the read sensor 134, the read sensor 134 mainly receives the magnetic charge on the side of the permanent magnet 136 nearest to the sensor 134. If the magnetization M is set normal to the air-bearing surface of the read sensor 134, then the angle ⊖ will be zero and the magnetic field at the sensor 134 will be a maximum. If the magnetization M is set at an angle in a direction other than normal to the air bearing surface 150, then the field at the sensor 134 will be smaller. Therefore, rather than positioning a permanent magnet having a magnetization that is normal to the air-bearing surface 150 of the read sensor 134, the invention provides for placing a permanent magnet 136 adjacent the read sensor 134 where the permanent magnet 136 has a magnetization in a direction other than normal to the air-bearing surface 150. The direction of magnetization of the permanent magnet 136 can, therefore, be adjusted to vary the strength of the magnetic bias field H to be generated in the read sensor 134. Thus, once the read sensor 134 is constructed and it is determined exactly how much biasing is needed based upon the particular construction of the read sensor 134, a permanent magnet 136 having a magnetization M in a particular direction may be selected for providing the proper biasing. This is advantageous because the permanent magnet 136 with a particular magnetization M may be predetermined prior to completing assembly of the read head to contain these components.

More specifically, the magnetization M of the permanent magnet 136 may be broken down into components Mx, My and Mz consistent with the X, Y, and Z directions illustrated in the coordinate system 156. Likewise, the biasing field H at a given location on or adjacent the read sensor 134, may also be broken down into components Hx, Hy, and Hz in the X, Y, and Z directions. As stated, when the permanent magnet 136 is much larger than the read sensor 134, the sensor 134 is primarily affected by the magnetic charge on the side of the permanent magnet 136 nearest to the sensor, i.e. My. It has been determined that Hy is directly proportional to the My component of the permanent magnet 136 magnetization. Therefore, by adjusting the direction of the magnetization M, My is adjusted and Hy is also adjusted. Although adjustment of the magnetization M also affects the Mx component thereof, by maintaining the permanent magnet 136 as much larger than the read sensor 134, Hx is maintained as a small value and does not have much affect on the overall strength of the field H at or near the sensor 134.

To further illustrate these points, reference is made to FIGS. 4a, 4b, 5a, 5b, 6a and 6b. These figures illustrate the values of Hx and Hy for various orientations of the magnetization M of the permanent magnet 136. The FIGS. 4a–6b are for a permanent magnet 136 having the X, Y, and Z dimensions of 10 μm×10 μm×1000 Angstroms and Ms=555 emu/cc. The coordinate X=0 μm and Y=5 μm in FIGS. 4a–6b refers to a point in the center in of the read sensor 134 in the X direction and at the very edge of the permanent magnet 136 in the Y direction. The value for Hz in each of these graphs was always less than 1 oersted, so those graphs are not shown here.

Figure 4A:
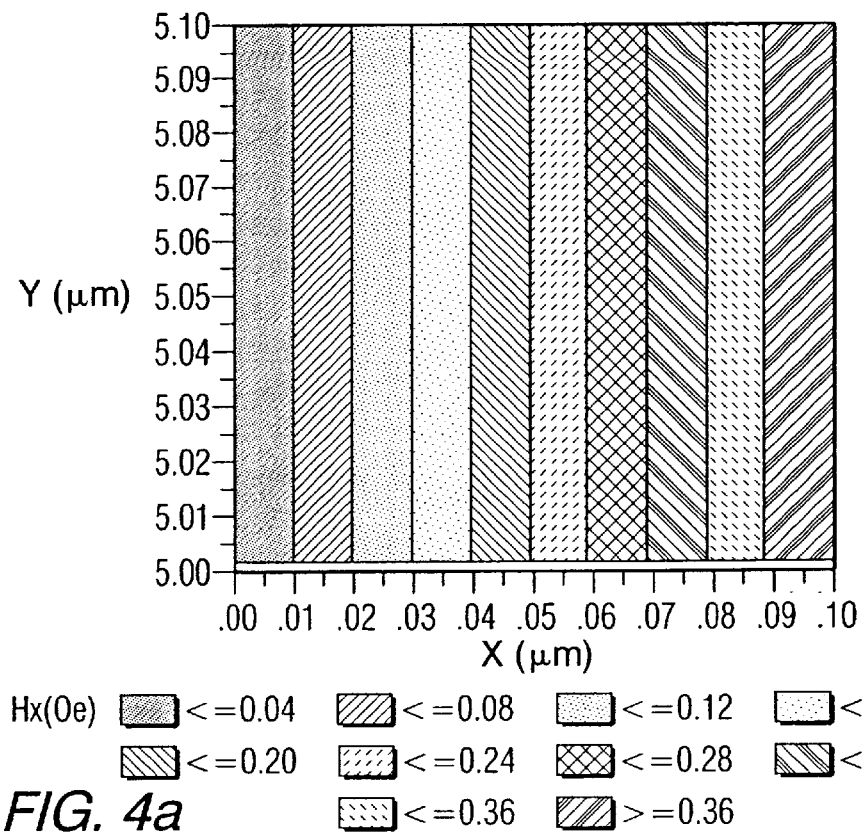
FIGS. 4a–6b are graphical illustrations of the magnetic bias field strength for the permanent magnet shown in FIG. 3 with the magnetization thereof set in various directions.
Figure 4B:
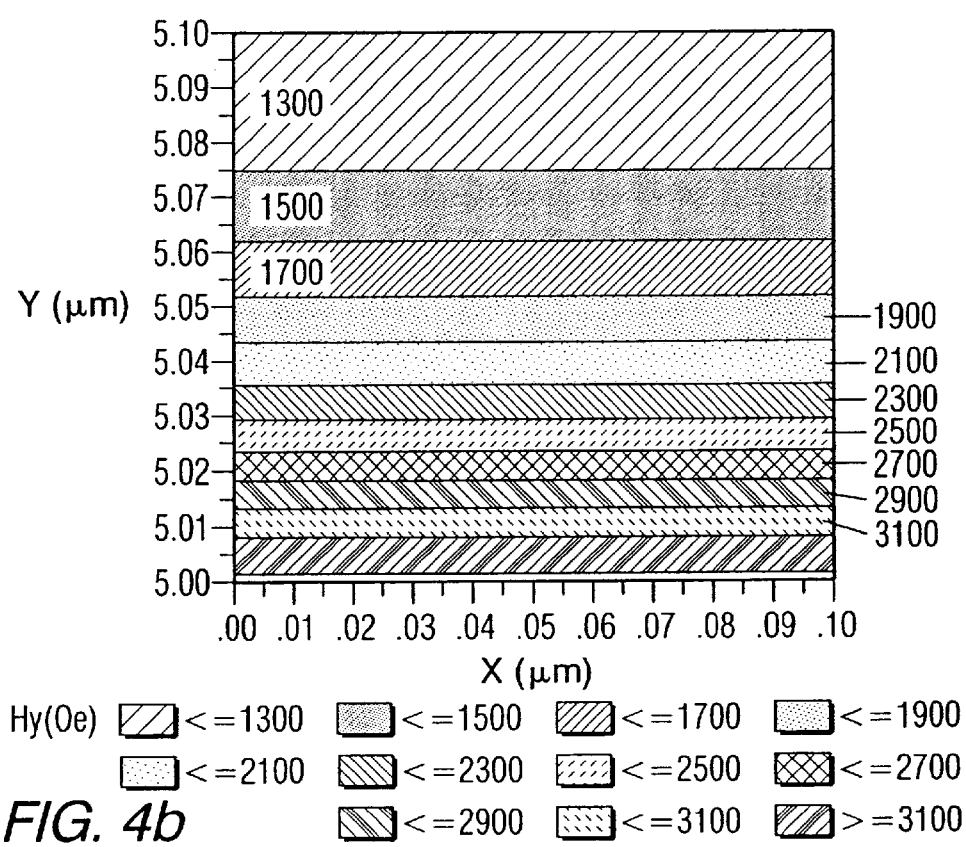

FIGS. 4a and 4b show the values of Hx and Hy, respectively, for the permanent magnet 136 wherein the magnetization direction is normal to the air-bearing surface 150 of the read sensor 134, i.e. ⊖=0°. As shown in FIG. 4a, the maximum Hx is 0.36 Oe and Hy at approximately 50 nm from the permanent magnet 136 is approximately 1900 Oe. This is determined to be the maximum Hy that can be applied to the sensor 134 using this particular permanent magnet 136.

Figure 5A:
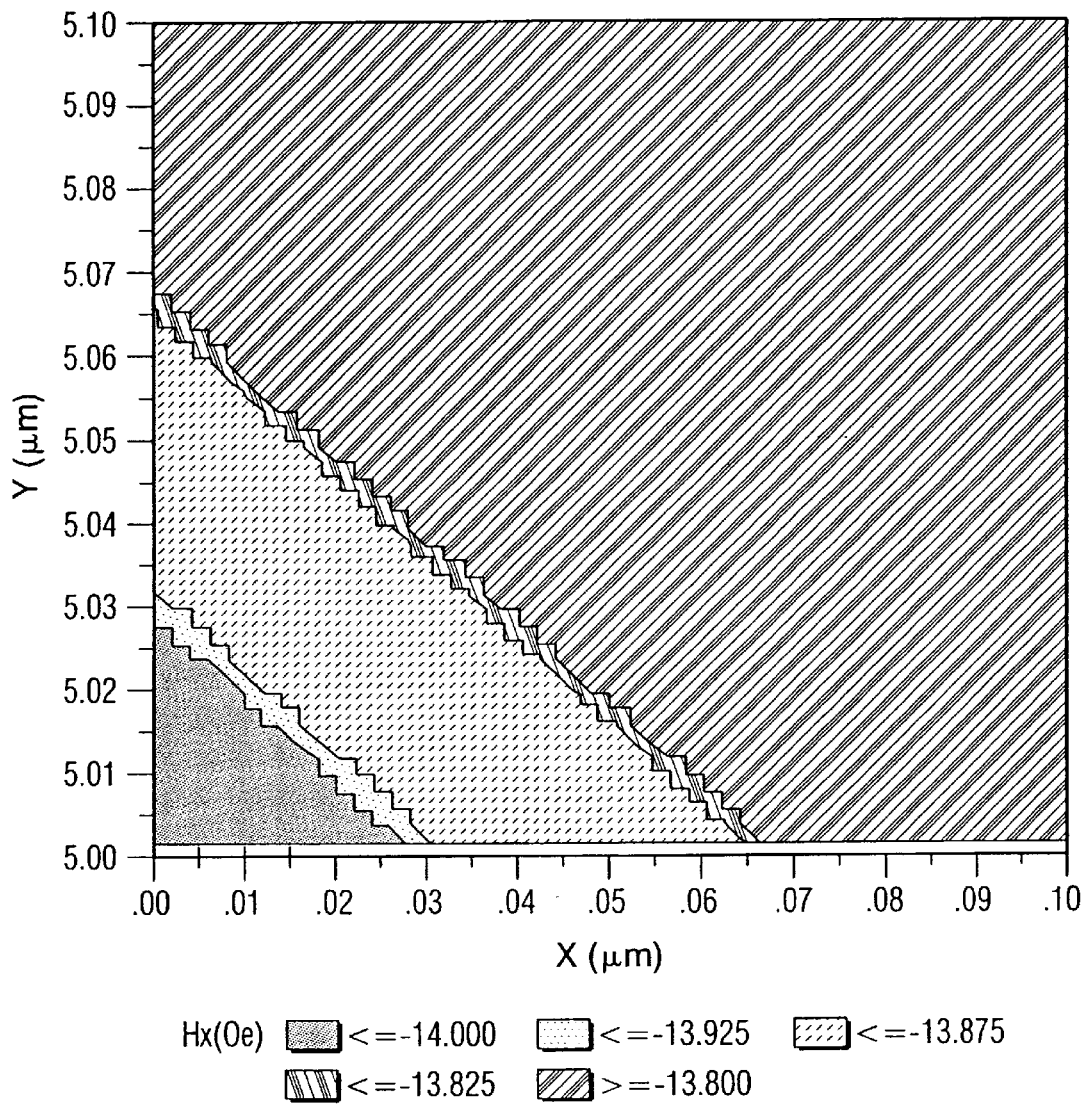
Figure 5B:
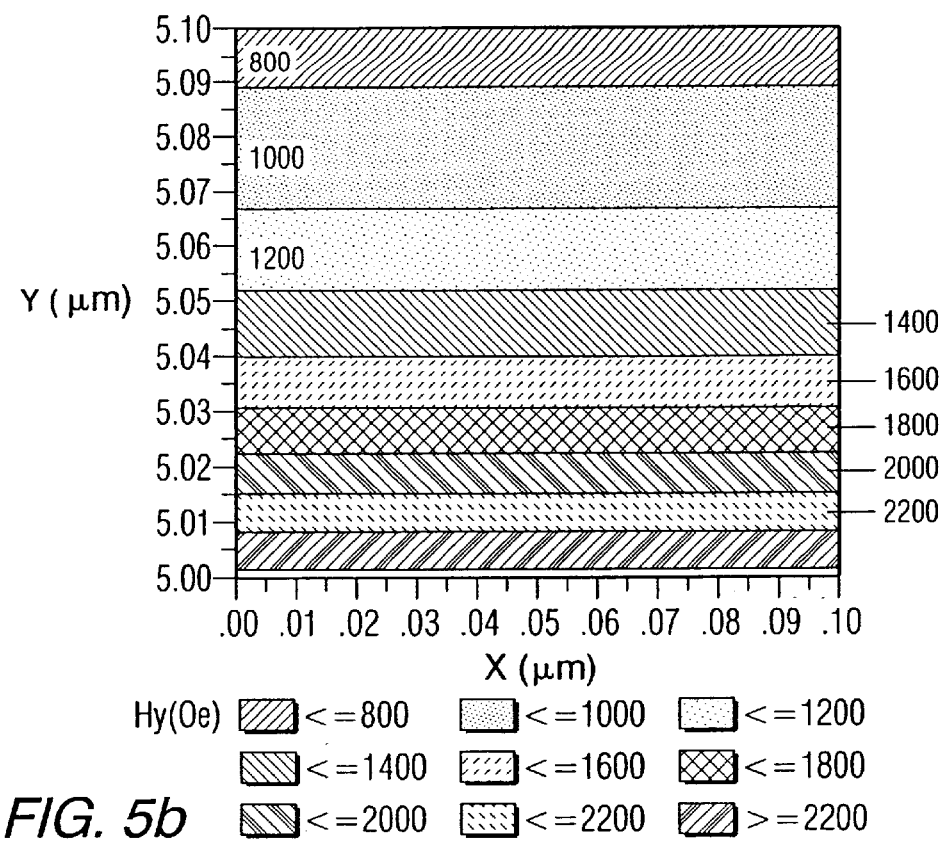

Referring to FIGS. 5a and 5b, the values of Hx and Hy are shown for the permanent magnet 136 having a magnetization M in a direction of ⊖ equals 45° with respect to the air-bearing surface 150 of the sensor 134. The maximum Hx is determined to be −13.8 Oe and Hy at approximately 50 nm from the permanent magnet 136 is approximately 1400 Oe.

Figure 6B:
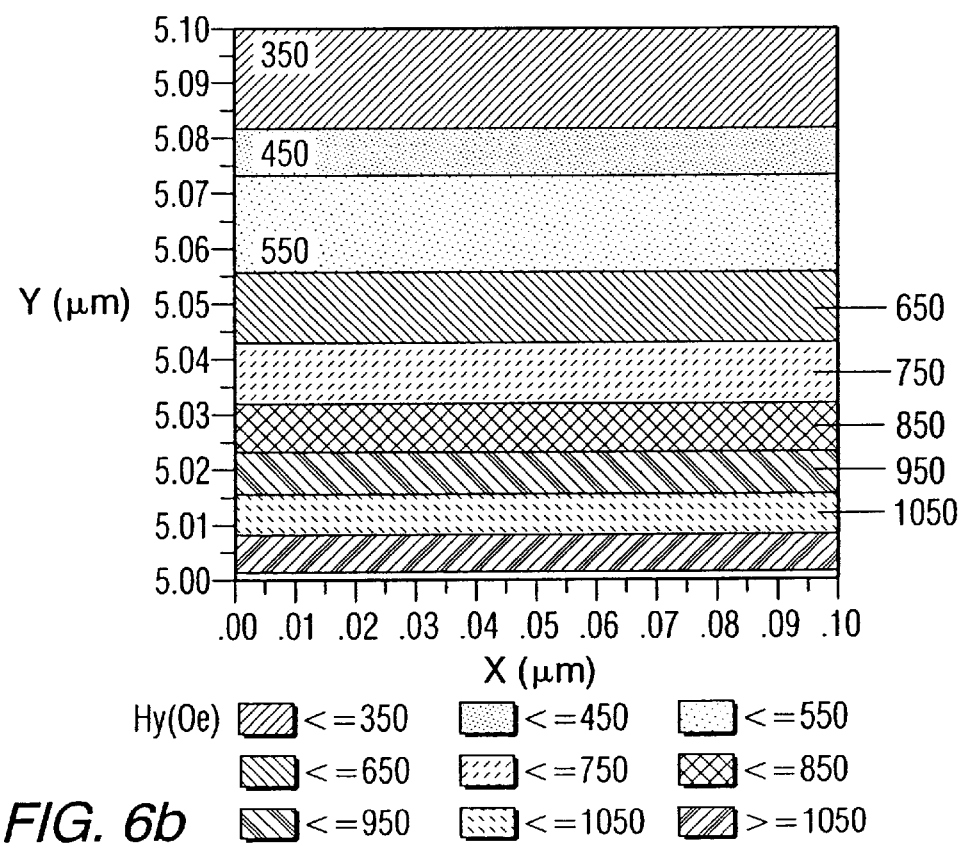
Figure 6A:
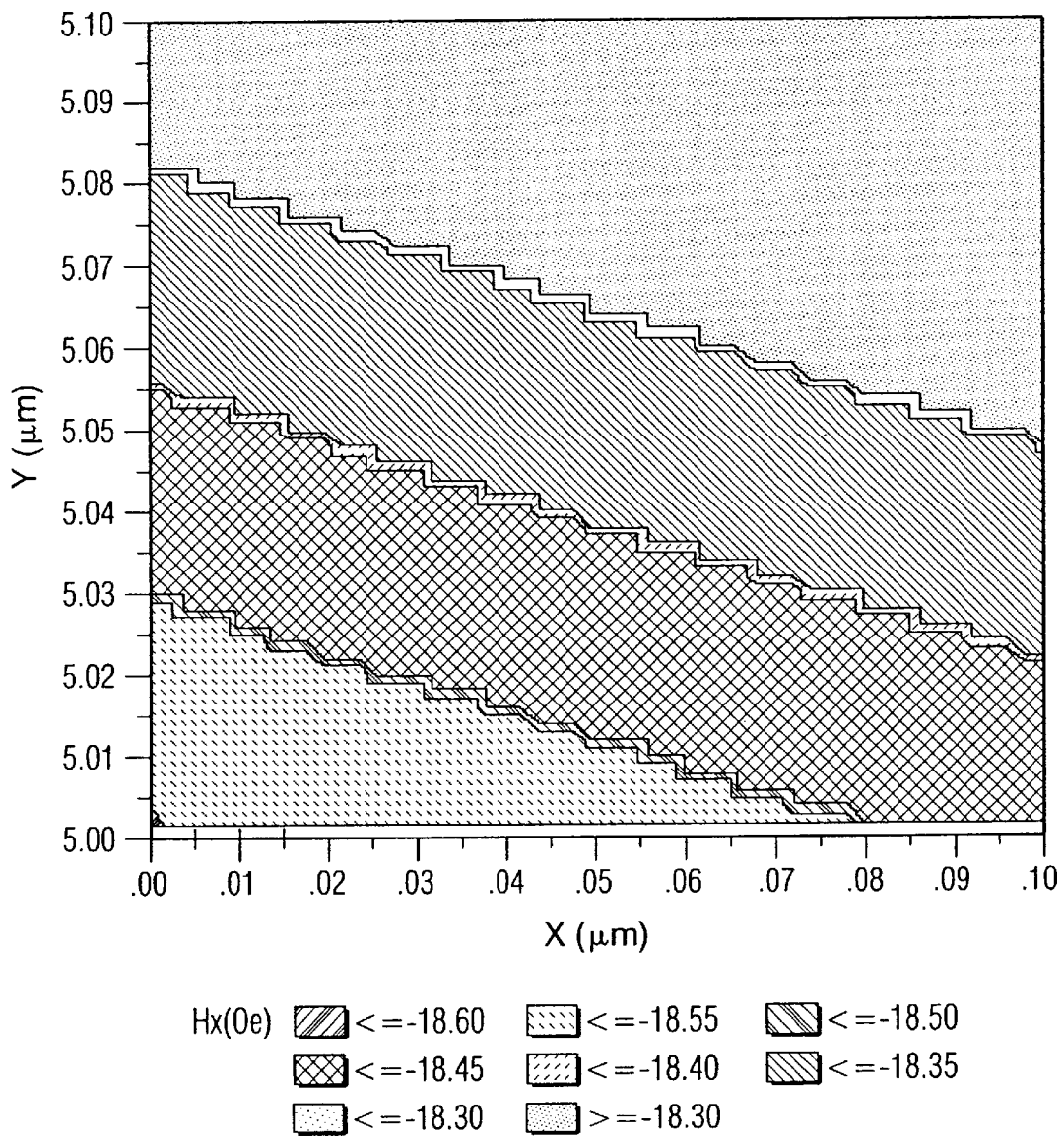

FIGS. 6a and 6b show the values of Hx and Hy, respectively, for the permanent magnet 136 wherein the magnetization is in a direction of ⊖ equals 70° with respect to the air-bearing surface 150 of the read sensor 134. For this particular orientation of the magnetization of the permanent magnet 136, the maximum Hx is determined to be −18.3 Oe and Hy at 50 nm from the permanent magnet 136 is approximately 650 Oe.

From the modeling results of the permanent magnet 136 described herein with various orientations of the magnetization direction M, it is determined that by rotating the direction by which the magnetization is set, the bias field H, and particularly the Y component thereof, Hy, can be adjusted over a wide range without creating a large field in the X direction of the bias field, Hx. As stated herein, My is proportional to Hy of the bias field allowing for the bias field to be determined based upon the amount of magnetic bias field to be generated in the read sensor 134. Therefore, once the read sensor 134 is constructed and tested to determine the amount of biasing needed in order to position the magnetizations of the adjacent ferromagnetic layers in the ideal or desired direction, the permanent magnet 136 magnetization direction can be adjusted and selected accordingly.

The invention also includes a method of using a permanent magnet, such as permanent magnet 136, to generate a magnetic bias field in a read sensor, such as read sensor 134. The method includes establishing a magnetization in the permanent magnet and positioning the permanent magnet adjacent to the top surface of the read sensor such that the magnetization of the permanent magnet is in a direction other than normal to the air-bearing surface of the read sensor. In accordance with the descriptions set forth herein, the method may include adjusting the magnetization direction of the permanent magnet to adjust the strength of the magnetic bias field generated in the read sensor. The method may also include predetermining the direction of magnetization of the permanent magnet according to the desired amount of magnetic bias field to be generated in the read sensor. The method is applicable for a read sensor that is a giant magnetoresistance sensor that is constructed as a current perpendicular to the plane type sensor, or other similar type sensors.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A current perpendicular to the plane read head, comprising:
    a read sensor having an air-bearing surface and an opposing top surface; and;
    a permanent magnet positioned adjacent said top surface of said read sensor for generating a magnetic bias field in said read sensor, said permanent magnet having a magnetization in a direction other than normal to said air-bearing surface of said read sensor.

2. The read head of claim 1, wherein said read sensor includes alternating layers of ferromagnetic and non-magnetic material.

3. The read head of claim 2, wherein said ferromagnetic material is selected from the group consisting of CoFe, NiFe, CoNiFe, Co and CoNi.

4. The read head of claim 1, wherein said permanent magnet is formed of a material selected from the group consisting of CoX where X is Pt, Ta, Cr, B or any combination thereof.

5. The read head of claim 1, wherein said permanent magnet is larger in size than said read sensor.

6. The read head of claim 1, wherein said read sensor is a giant magnetoresistance sensor.

7. The read head of claim 1, further comprising a first lead/shield and a second lead/shield, said read sensor and said permanent magnetic positioned between said first lead/shield and said second lead/shield.

8. A current perpendicular to the plane read head, comprising:
    a read sensor; and
    means for generating and adjusting a magnetic bias field in said read sensor.

9. A read head for a magnetic disc storage system, comprising:
    a read sensor having an air-bearing surface and an opposing top surface; and
    a permanent magnet positioned adjacent the top surface of the read sensor for magnetically biasing the read sensor, said permanent magnet having a magnetization set in a direction other than normal to the air-bearing surface of the read sensor.

10. The read head of claim 9, wherein said read sensor is a current perpendicular to the plane type sensor.

11. The read head of claim 9, wherein said permanent magnet includes a bottom surface contained in a plane that is generally parallel to a plane containing the top surface and an additional plane containing the air-bearing surface of said read sensor.

12. The read head of claim 9, wherein the direction of magnetization of said permanent magnet is predetermined according to the desired amount of magnetic biasing to be applied to said read sensor.

13. The read head of claim 9, wherein said read sensor is a giant magnetoresistance sensor.

14. A magnetic disc drive storage system, comprising:
    a housing;
    a rotatable magnetic storage medium positioned in said housing; and
    a movable recording head mounted in said housing adjacent said magnetic storage medium,
    said recording head including a current perpendicular to the plane read head comprising:
        a read sensor having an air-bearing surface and an opposing top surface; and
        a permanent magnet positioned adjacent said top surface of said read sensor for generating a magnetic bias field in said read sensor, said permanent magnet having a magnetization in a direction other than normal to said air-bearing surface of said read sensor.

15. A method of using a permanent magnet to generate a magnetic bias field in a read sensor having an air-bearing surface and an opposing top surface, comprising:
    establishing a magnetization in the permanent magnet; and
    positioning said permanent magnet adjacent to the top surface of the read sensor such that the magnetization of the permanent magnet is in a direction other than normal to the air-bearing surface of the read sensor.

16. The method of claim 15, further comprising constructing the read sensor as a current perpendicular to the plane type sensor.

17. The method of claim 15, further comprising adjusting the magnetization direction of the permanent magnet to adjust the strength of the magnetic bias field generated in the read sensor.

18. The method claim 15, further comprising predetermining the direction of magnetization of the permanent magnet according to the desired amount of magnetic bias field to be generated in the read sensor.

19. The method of claim 15, wherein the read sensor is a giant magnetoresistance sensor.

* * * * *

UNITED STATES PATENT AND TRADEMARK OFFICE
CERTIFICATE OF CORRECTION

PATENT NO.    : 6,724,583 B2  
DATED         : April 20, 2004  
INVENTOR(S)   : Michael Allen Seigler et al.

It is certified that error appears in the above-identified patent and that said Letters Patent is hereby corrected as shown below:

<u>Title page,</u>  
Item [54], Title, "ADJUSTABLE PERMANENT MAGNET BIAS" should read  
-- ADJUSTABLE PERMANENT MAGNET BIAS FOR A MAGNETORESISTIVE SENSOR --.

Signed and Sealed this

Twenty-fifth Day of October, 2005

JON W. DUDAS  
*Director of the United States Patent and Trademark Office*